(12) United States Patent
Guercioni (10) Patent No.: US 8,793,864 B2
(45) Date of Patent: Aug. 5, 2014

(54) APPARATUS FOR STRIPPING ELECTRICAL BAR CONDUCTORS

(75) Inventor: Sante Guercioni, Teramo (IT)

(73) Assignee: Tecnomatic S.P.A., Teramo (IT)

( * ) Notice: Subject to any disclaimer, the term of this patent is extended or adjusted under 35 U.S.C. 154(b) by 0 days.

(21) Appl. No.: 13/387,727

(22) PCT Filed: Apr. 28, 2010

(86) PCT No.: PCT/IT2010/000187
§ 371 (c)(1),
(2), (4) Date: Jan. 28, 2012

(87) PCT Pub. No.: WO2011/135596
PCT Pub. Date: Nov. 3, 2011

(65) Prior Publication Data
US 2013/0031779 A1 Feb. 7, 2013

(51) Int. Cl.
B23P 23/00 (2006.01)
(52) U.S. Cl.
USPC .......................................... 29/564.4; 29/564.1
(58) Field of Classification Search
USPC .............................................. 29/564.1, 364.4
See application file for complete search history.

(56) References Cited

U.S. PATENT DOCUMENTS

| 3,587,673 A | 6/1971 | Smirnov | |
|---|---|---|---|
| 3,813,966 A * | 6/1974 | Knuth | 30/91.1 |
| 3,832,767 A | 9/1974 | Petree | |
| 3,895,426 A * | 7/1975 | Papsdorf | 29/867 |
| 4,067,250 A * | 1/1978 | Owen et al. | 81/9.51 |
| 4,081,871 A * | 4/1978 | Knuth | 7/107 |
| 4,527,451 A | 7/1985 | Davis | |
| 7,480,987 B1 | 1/2009 | Guercioni | |

FOREIGN PATENT DOCUMENTS

DE 31 48 890 6/1983

* cited by examiner

*Primary Examiner* — Carl Arbes
(74) *Attorney, Agent, or Firm* — Tarter Krinsky & Drogin LLP (57) ABSTRACT

Stripping apparatus (4) for an electrical bar conductor (8) having a metal core with two longer sides (12) and two shorter sides (16) coated with an electrically insulating coating (20). The apparatus (4) comprises a first stripping portion (24) that at least partly houses the conductor (8) arranged along a prevailing extension (X-X), so as to rest on one of said longer sides (12) cantilevered relative to a pair of supports (28). The first stripping station (24) houses a first pair of broaches (40), opposite to one another and arranged at opposite sides relative to the conductor (8), said broaches (40) being axially movable relative to a cross working direction (Y-Y) perpendicular to the prevailing extension (X-X). The broaches (40) are aligned with said stripping portion (36) relative to the prevailing extension (X-X), so as to carry out the removal of the insulating coating (20) at the stripping portion (36) comprised cantilevered between the supports (28).

17 Claims, 9 Drawing Sheets

APPARATUS FOR STRIPPING ELECTRICAL BAR CONDUCTORS

CROSS REFERENCE TO RELATED APPLICATIONS

This application is based on International Application No. PCT/IT2010/000187, filed on Apr. 28, 2010, the contents of which are incorporated herein by reference.

The present description relates to an apparatus for stripping electrical bar conductors, in particular for bar windings of electrical machines, and the relevant method for stripping an electrical bar conductor.

In particular, the components of electrical machines, such as stators and rotors, comprise electrical bar conductors having an essentially rectangular cross section, where by rectangular it is meant both the square section and the "flat" section by which in general, a section with a rectangular shape is indicated, in which one of the two sides of the section is shorter than the other.

Said electrical bar conductors are suitably coated with electrically insulating material, bent and variedly connected to each other so as to form so-called bar windings.

Enamel is normally used as electrically insulating material.

Electrical bar conductors are connected to one another, for making the components of electrical machines, at the ends through welding processes. In order to weld said ends it is first necessary to remove the electrically insulating material which covers them.

The operation for removing the insulating material, commonly called stripping, is carried out in the prior art by abrasive grinding wheels. Such abrasive grinding wheels are for example described in U.S. Pat. No. 7,480,987.

While the grinding of the conductors is widely used, it implies some drawbacks in terms of poor processing accuracy.

The processing accuracy is important since the thickness of the conductors is reduced, so there is the risk of not fully removing the insulating material or excessively reducing the resistive conductor section.

In both cases, the conductor would be rejected since on the one side, enamel residues would impair the subsequent conductor welding and on the other side, an excessive reduction of the resistive section may cause the conductor to break both during the welding and in the subsequent use on electrical machines, due to the vibrations related to the operation of the machines themselves.

Moreover, grinding produces a certain projection of scrap and it is desirable to eliminate such projection for keeping the machines as clean as possible.

The object of the present description is to provide an apparatus which should be such as to solve the drawbacks and/or the requirements mentioned with reference to the prior art.

Such drawbacks and/or requirements are solved by a stripping apparatus as defined in the annexed claim 1 and by a stripping method as defined herein.

Other embodiments of the present invention are described in the subsequent claims.

Further features and the advantages of the present invention will appear more clearly from the following description of preferred non-limiting embodiments thereof, wherein:

FIG. 9 shows an enlarged perspective view of detail IX of FIG. 3a;

FIG. 10 shows a side view of detail X of FIG. 3a;

FIGS. 11 and 12 show enlarged perspective views of details XI and XII of FIG. 3a;

Elements or parts of elements in common between the embodiments described below are referred to with the same reference numerals.

With reference to the annexed figures, reference numeral 4 globally indicates an apparatus for stripping an electrical bar conductor 8, for example with rectangular, flat or square cross section.

For the purposes of the present description, "flat" or "square" bar conductor indicates a bar conductor having four substantially flat sides, each connected to adjacent sides, typically by a rounded edge.

The expression "flat conductor" should be meant as indicating that the conductor has two opposite sides the distance whereof is greater than the distance between the two remaining opposite sides. For the purposes of the present description, the expression "rectangular conductor" should be meant as indicating a generalisation of a flat conductor and a square conductor, the square conductor being a particular case of rectangular conductor, wherein the four sides have equal dimensions.

Hereinafter, reference shall be made to a flat bar conductor having two larger sides 12 and two smaller sides 16, in pairs opposite to one another, so as to form a globally quadrangular section.

Conductor 8 is for example a conductor comprising a copper core, or made of any other electrically conductive material, and an insulating coating 20, such as for example an electrically insulating enamel that at least partly coats said core.

Coating 20 is for example applied in the extrusion step by a facing process of insulating material in a calibrated and continuous manner.

The stripping apparatus 4 of the present description may be, without distinction, an independent machine or a workstation of a system for producing a component of an electrical machine such as a stator or a rotor.

According to an embodiment, the stripping apparatus 4 represents a stage of a pre-forming machine, for example but without limitations, as described in U.S. Pat. No. 7,480,987, wherein apparatus 4 of the present description would replace the "STRIP" stage of such machine intended for grinding bar conductors previously unwound from a coil and straightened.

Conductor 8, after having been stripped, is then cut at the portions wherefrom the insulating coating has been removed to then be subject, for example, to the subsequent bending operations.

The stripping apparatus 4 according to the present description comprises a first stripping station 24 that receives conductor 8, provided with insulating coating 20, and arranged along a prevailing extension X-X.

For example, conductor 8 may be fed as coils that are unwound so as to feed conductor 8 in a rectilinear shape parallel to the prevailing extension X-X.

Conductor 8 is preferably arranged so as to rest with at least one of said longer sides 12 on a pair of supports 28, spaced from one another so as to delimit a first stripping seat 32 wherein a stripping portion 36 of conductor 8 is seated, cantilevered relative to said supports 28, intended for being stripped of the insulating coating 20.

In other words, the stripping portion 36 of conductor 8 has an axial length, measured parallel to said prevailing extension X-X, shorter than or equal to the distance between said supports 28.

The stripping apparatus 4 comprises tools for the forced removal of said insulating coating 20 at least at said stripping portion 36 of conductor 8.

Advantageously, the first stripping station 24 houses, at least partly, a first pair of broaches 40, opposite to one another and arranged at opposite sides relative to conductor 8, broaches 40 being axially movable relative to a cross working direction Y-Y perpendicular to the prevailing extension X-X and parallel to said longer sides 12.

The first broaches 40 are aligned with said first stripping seat 32 so as to intercept the stripping portion 36 cantilevered relative to the prevailing extension X-X, and carry out the removal of coating 20 at the stripping portion 36 comprised between supports 28 in a cantilevered manner.

According to an embodiment, each broach 40 has a fork or 'U' shape provided with a pair of branches 44 having each a tool 48 for removing coating 20.

Preferably, said tools 48 are small plates provided on a working end 52 of said branches 44, having an edge or cutting edge 56 suitable for removing coating 20.

Tools 48 are provided on said working ends 52 of branches 44 preferably by braze welding.

Branches 44 are opposite to each other so as to determine an air gap 60 having a smaller thickness than said shorter sides 16 of conductor 8, so as to pitchfork conductor 8 arranging branches 44 parallel to the longer sides 12 of the conductor itself and remove by interference the insulating coating 20 on said longer sides 12 at the same time.

The thickness of air gap 60 is such as to be substantially equal to the thickness of the core of conductor 8, measured as distance between said longer sides 12. In this way, the removal of the entire coating 20 from the longer sides 12 is guaranteed, upon the passage of the first pair of broaches 40 on conductor 8.

According to an embodiment, the thickness of air gap 60 is such as to be substantially smaller than the thickness of the core of conductor 8 so that, removing also a portion of the core there is the certainty of having fully removed the insulating layer in the working region.

Preferably, branches 44 of the broaches of the first pair of broaches 40 are equal to each other by length, said length being measured parallel to the cross working direction Y-Y.

According to an embodiment, the first stripping station 24 delimits a first seat 64 of conductor 8, said seat 64 being arranged parallel to the prevailing extension X-X and comprising a pair of side containment walls 68, directly facing the shorter sides 16 of conductor 8, so as to contain any bending deformations of conductor 8 perpendicular to said shorter sides 16.

In particular, conductor 8 is housed with slight clearance between said side containment walls 68. During the removal step of coating 20, broaches 40 exert a friction action on the longer sides 12 of conductor 8. Such friction action, exerted along the cross working direction Y-Y, perpendicular to the prevailing extension X-X, causes a bending of the conductor relative to the shorter sides 16.

Such bending is allowed by the presence of unavoidable clearance between conductor 8 and the first housing seat 64, without which conductor 8 would not be able to slide within the seat itself.

The side containment walls 68 allow controlling the side deformations of conductor 8, along the cross working direction Y-Y, so as to allow only small and controlled deformations falling within the field of elastic deformations, so as to not cause any plastic, i.e. permanent, deformation in the conductor subsequent to the passage of broaches 40.

According to an embodiment, the side containment walls 68 are at least partly defined by calibrated plates 72, provided on the first seat 64, for example by threaded connecting means for allowing the removal and/or replacement thereof.

The calibrated plates 72 are arranged parallel to the prevailing extension X-X so as to cross also the first stripping seat 32. In other words, the calibrated plates are also partly cantilevered relative to supports 28.

The calibrated plates 72, at said cantilevered portion between supports 28, comprise at least one undercut 76 so as to have a thickness smaller than or equal to the thickness of conductor 8 after stripping, measured perpendicularly to the longer sides 12, for allowing the passage of said broaches 40 on the calibrated plates 72 without exerting any interference between broaches 40 and the calibrated plates 72.

Undercut 76 has a cross extension 78 substantially equal to the stroke that the corresponding broach 40 carries out, overlapping to the relevant calibrated plate 72. Thus, the calibrated plates 72 cannot have undercuts 76 with different cross extensions 78 based on different strokes of the respective broaches 40.

Preferably, the calibrated plates 72 comprise a pair of undercuts 76, opposite to one another, each substantially aligned to a corresponding longer side 12 of conductor 8.

In other words, the calibrated plates 72 are fixed along with conductor 8, whereas broaches 40, during the removal of coating 20 along the cross working direction Y-Y, intercept both the calibrated plates 72, at undercuts 76, and conductor 8, at the longer sides 12.

Such broaches 40 do not interfere on their passage with the calibrated plates 72, thanks to the presence of undercuts 76 that reduce the thickness thereof, but on the other hand they interfere with the longer sides 12 of conductor 8 removing the coating 20 thereof.

Preferably, air gap 60, formed by the pairs of branches enlarges inwards of branches 44 of broaches 40, that is, in removal from tools 48. Preferably, said enlargement is obtained by flares 80 that favour the passage with clearance of broaches 40 on the calibrated plates 72 during the retraction and advancement.

The first broaches 40 are mechanically connected to first actuating members 84 according to a rotation-translation coupling.

For example, such coupling is of the rod-crank type wherein a connecting rod 88 is mechanically connected to broaches 40 for allowing the movement thereof along the cross working direction Y-Y, whereas a crank 90 rotates actuated by motor means.

For example, the coupling between broaches 40 and the relevant first actuating members 84 is a shape coupling of the prismatic type: in other words, broaches 40 comprise a connecting appendix 92 that inserts according to a shape coupling with a counter shaped seat 96.

Preferably, the first actuating members 84 of the two broaches 40 are synchronised with each other so as to impart precise actuating strokes to broaches 40, opposite and synchronised with one another, as better described hereinafter.

According to an embodiment, the stripping apparatus 4 comprises a second stripping station 100, suitable for receiving conductor 8 protruding from the first stripping station 24 and carrying out the removal of coating 20 from said shorter sides 16 of conductor 8.

Preferably, said second stripping station 100 is aligned with respect to the first stripping station 24 relative to the prevailing extension X-X of conductor 8, so as to receive conductor 8 in output from the first stripping station 24 keeping the straightness and the parallelism of conductor 8 relative to the prevailing extension X-X.

According to an embodiment, the second stripping station 100 houses conductor 8 in a second seat 104 defining a support surface 108 suitable for receiving conductor 8 resting at a longer side 12 thereof.

The support surface 108 is delimited by a pair of cavities 112, arranged at opposite sides of the conductor relative to the cross working direction Y-Y. Cavities 112 extend perpendicular to the support surface 108 along a vertical working direction Z-Z, substantially parallel to said shorter sides of conductor 8 resting on said support surface 108.

The support surface 108 has a smaller cross width than the longer sides 12 of conductor 8, so that in resting configuration of conductor 8 on said surface 108, the shorter sides 16 are at least partly cantilevered relative to the surface itself, along the cross working direction Y-Y.

Preferably, the support surface 108 has a longitudinal extension, parallel to the prevailing extension X-X, substantially equal to that of the stripping portion 36.

The support surface 108 is delimited by two pairs of shoulders 116, along the prevailing extension X-X, which delimit and contain any cross movements of conductor 8.

Preferably, said shoulders 116 comprise, opposite the associable conductor 8, inclined planes 120 that joint cavities 112 to the support surface 108.

The second stripping station 100 comprises a second pair of broaches 124, substantially counter-shaped relative to cavities 112, so as to slide in a guided manner within the same cavities 112, parallel to the vertical working direction Z-Z.

The second broaches 124 comprise cutting edges 128 shaped so as to intercept said shorter sides 16 of conductor 8 which are at least partly cantilevered relative to the support surface 108.

In this way, the cutting edges 128 can remove the insulating coating 20 from the shorter sides 16 of conductor 8 at the same time, without interfering with the support surface 108.

Preferably, the second broaches 124 are integrally connected to one another by a crosspiece 128 that therefore allows the concurrent actuation thereof.

Preferably, the cutting edges 128 are at least partly counter shaped relative to said inclined planes 120.

The working stroke of the second broaches 124, parallel to the vertical working direction Z-Z, is for example stopped by the contact of a stopping surface 132 of the second broaches 124 against a corresponding abutment 136 obtained for example on the second housing seat 104.

The second pair of broaches 124 is actuated by relevant motor means.

The method for stripping a conductor according to the present invention shall now be described.

Figure 1:
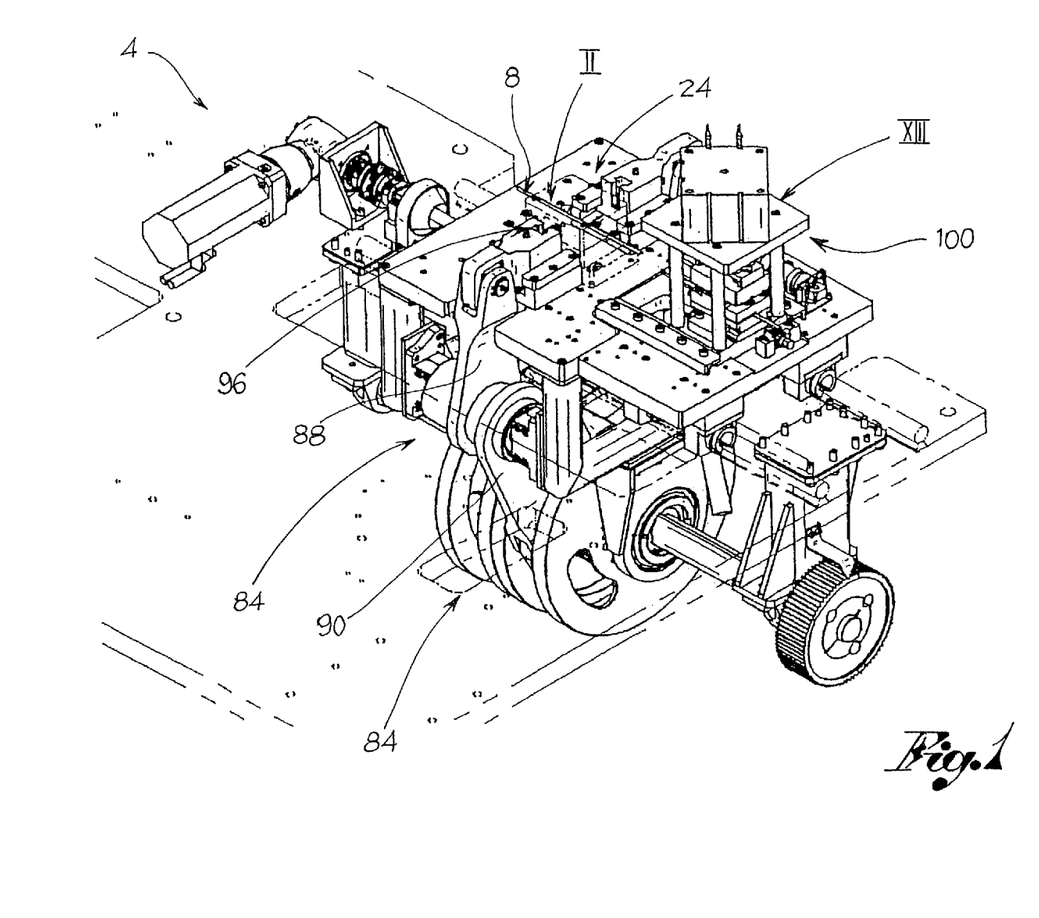
FIG. 1 shows a perspective view of a stripping apparatus according to the present description.
Figure 2:
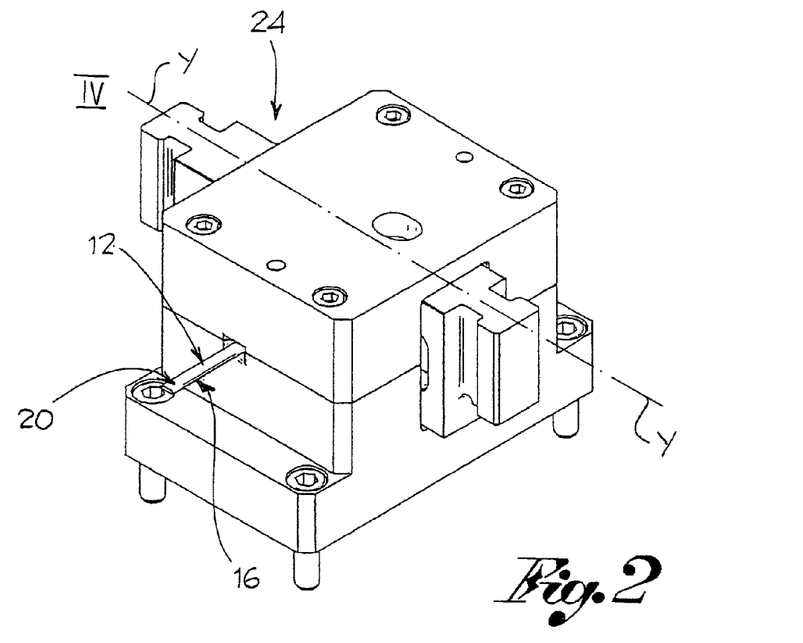
FIG. 2 shows a perspective view of component II of the apparatus of FIG. 1.
Figure 3A:
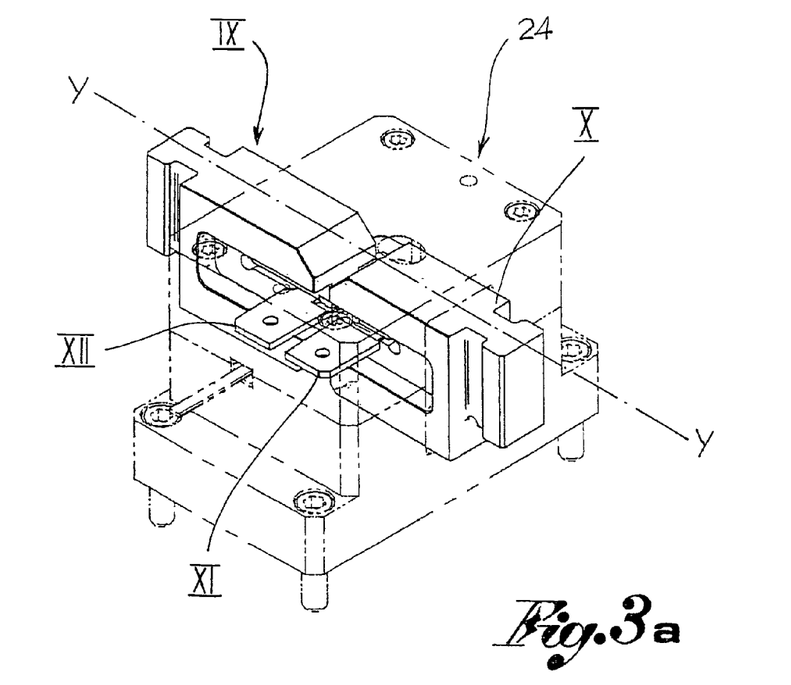
FIG. 3a-3c show perspective, partly cutaway views of component II of the apparatus of FIG. 1, according to different angles.
Figure 3B:
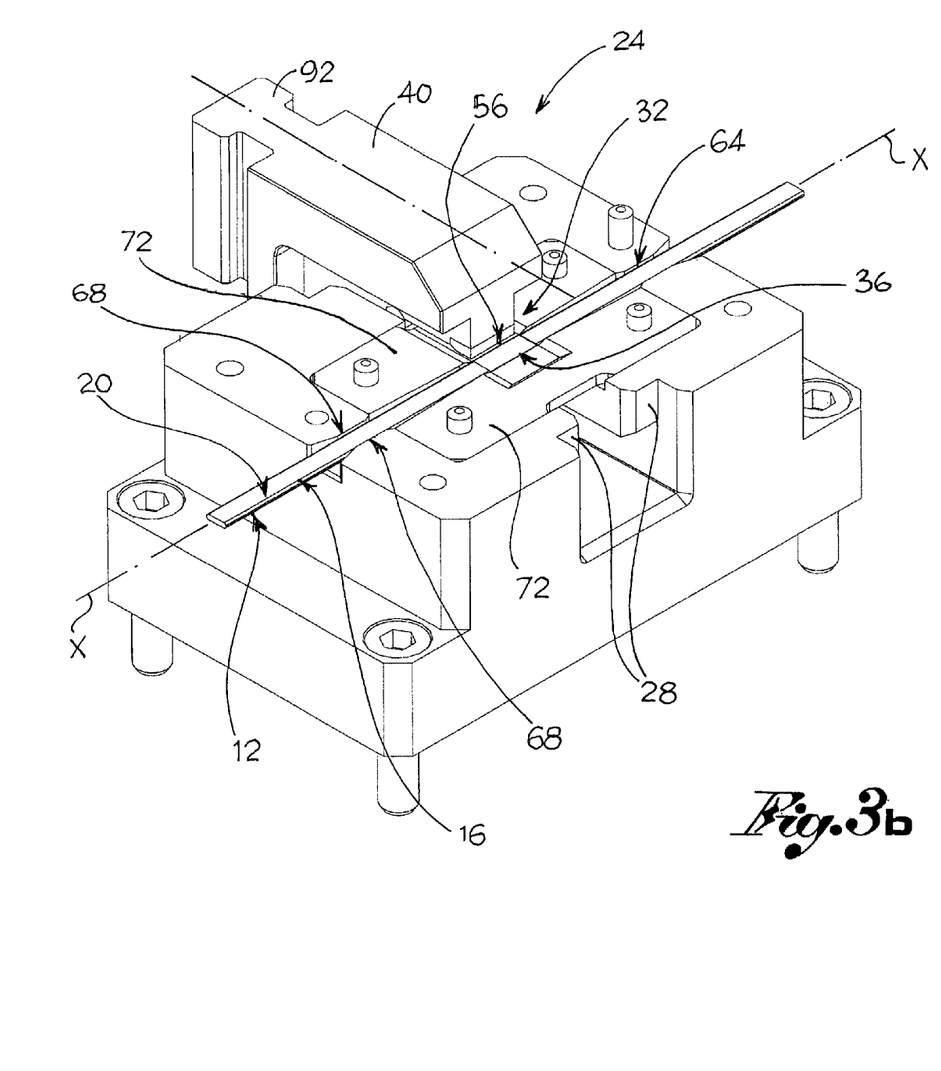
Figure 3C:
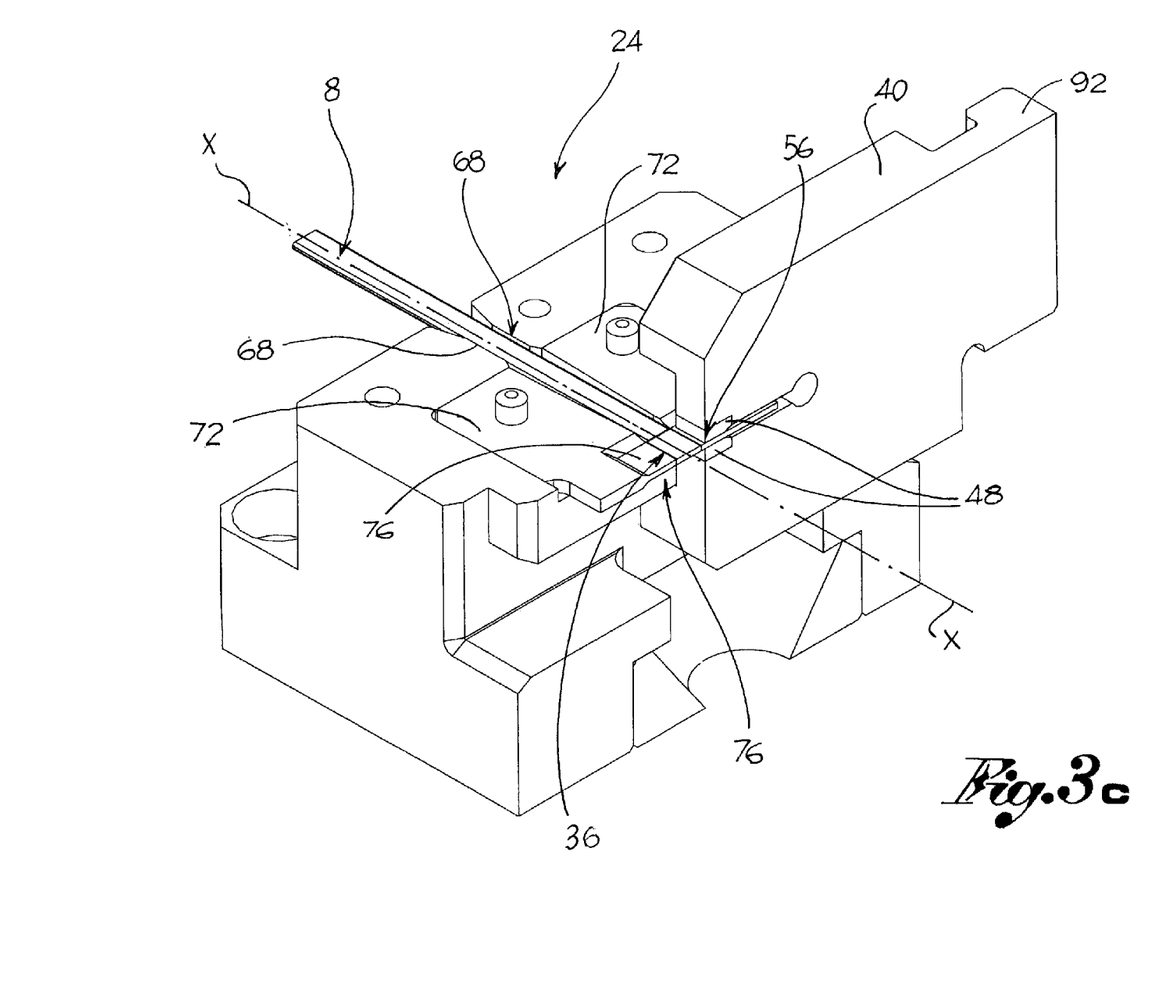
Figure 4:
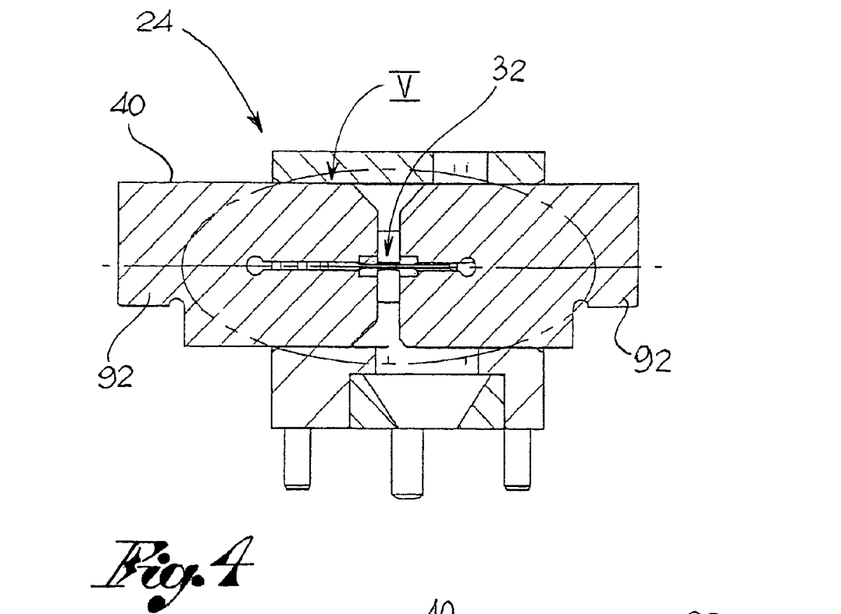
FIG. 4 shows a cutaway view of component II of FIG. 1, along the section plane IV of FIG. 2.
Figures 5, 6, 7, 8:
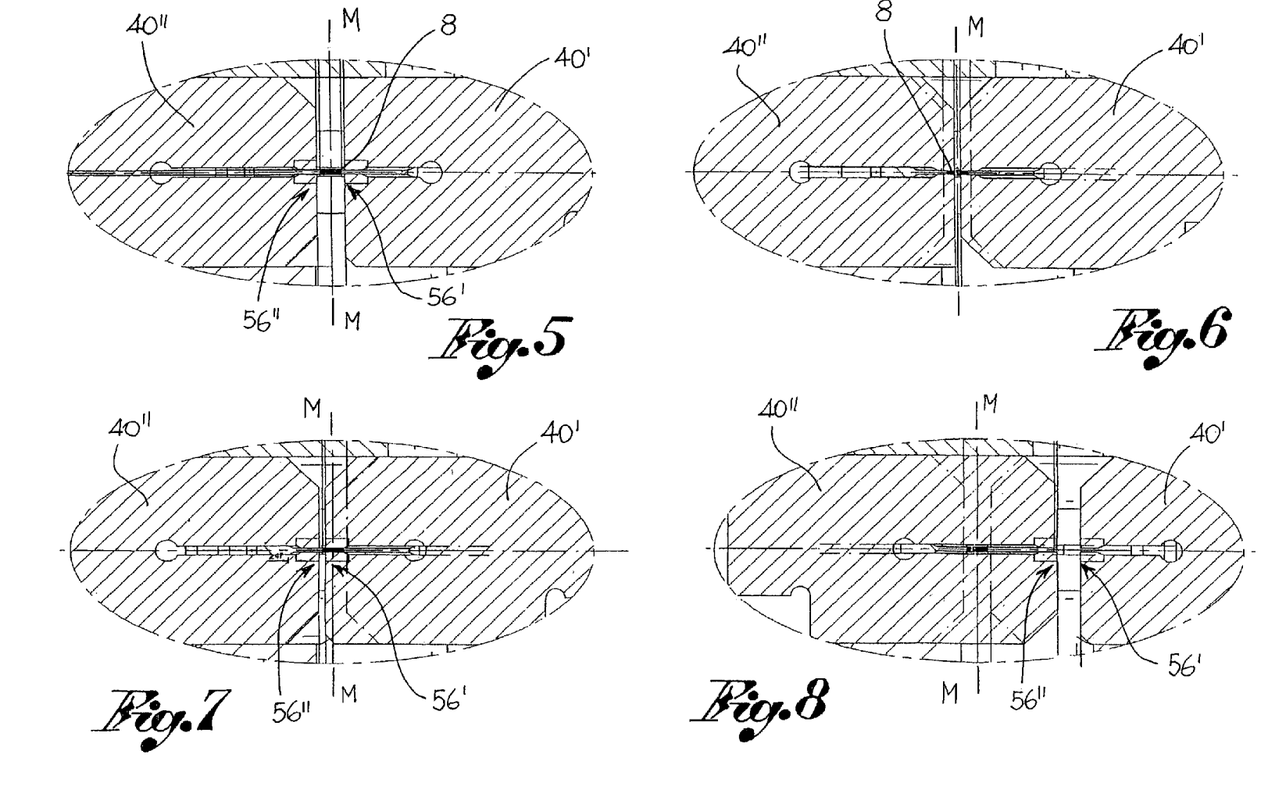
FIGS. 5-8 show partly cutaway views of detail V of FIG. 4, in subsequent stripping steps.
Figure 9:
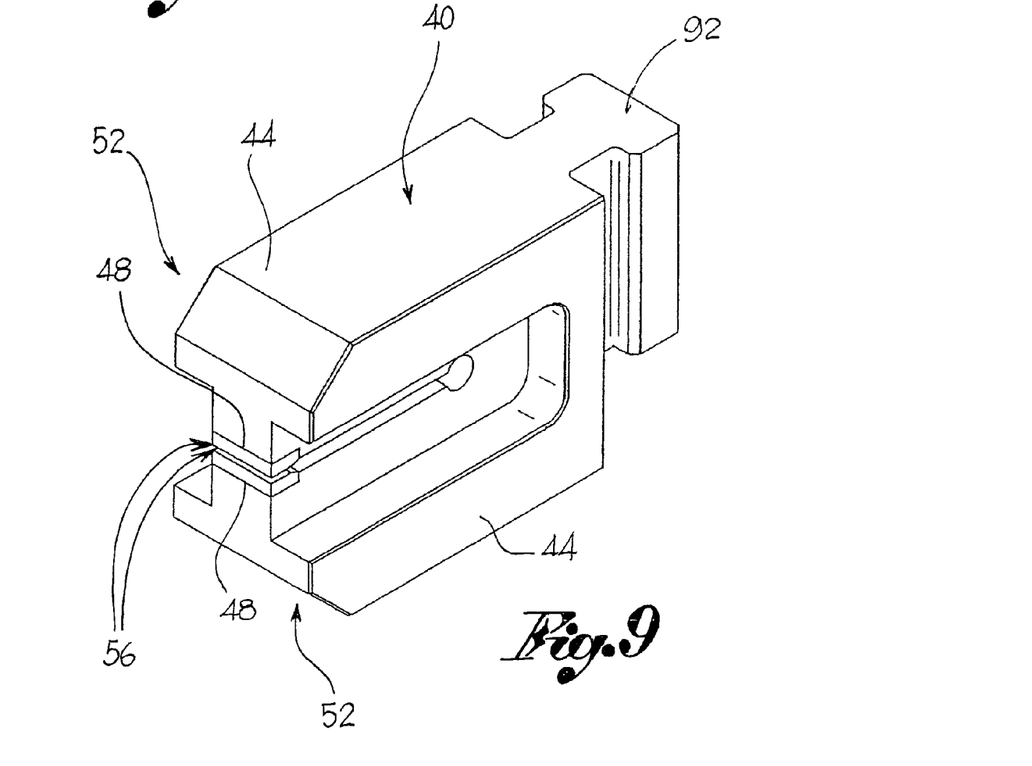
Figure 10:
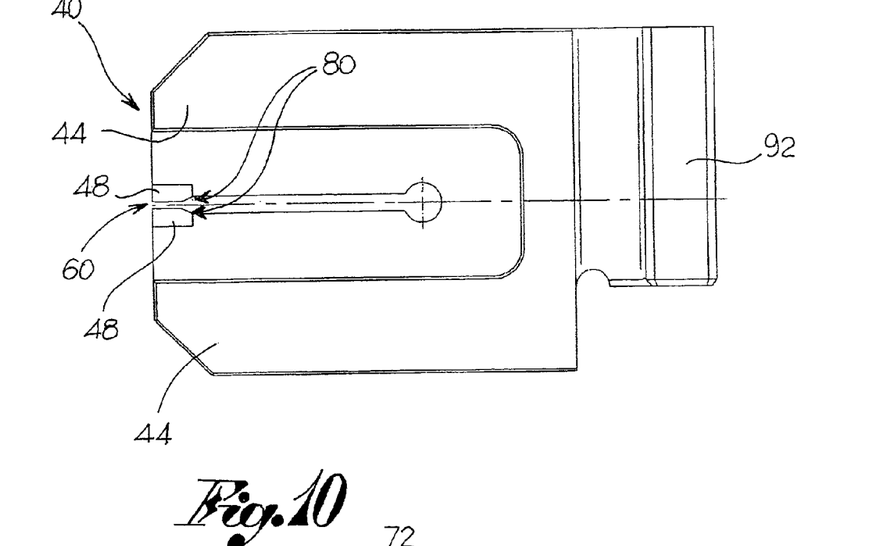
Figure 11:
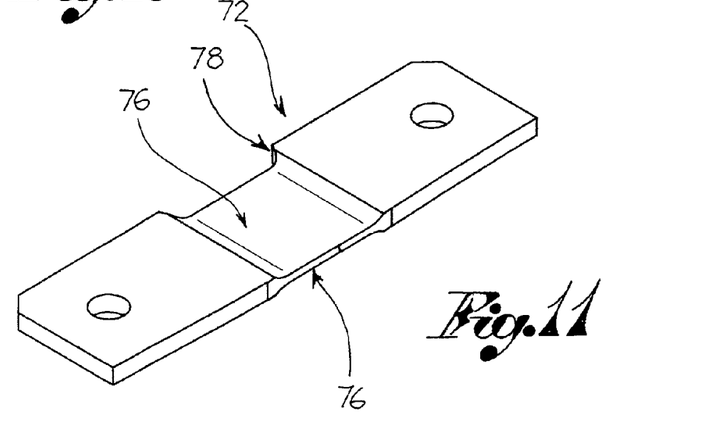
Figure 12:
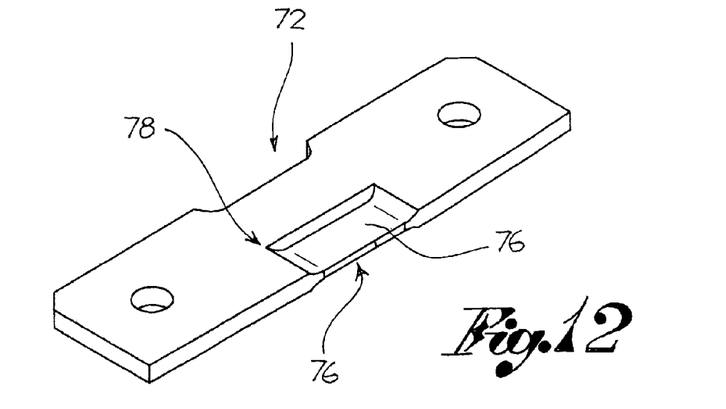
Figure 13:
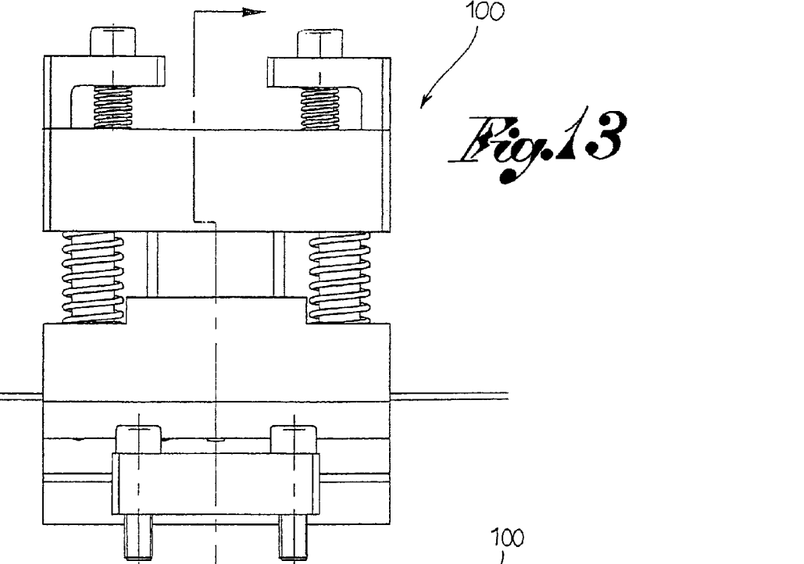
FIG. 13 shows an enlarged side view of detail XIII of FIG. 1.
Figure 14:
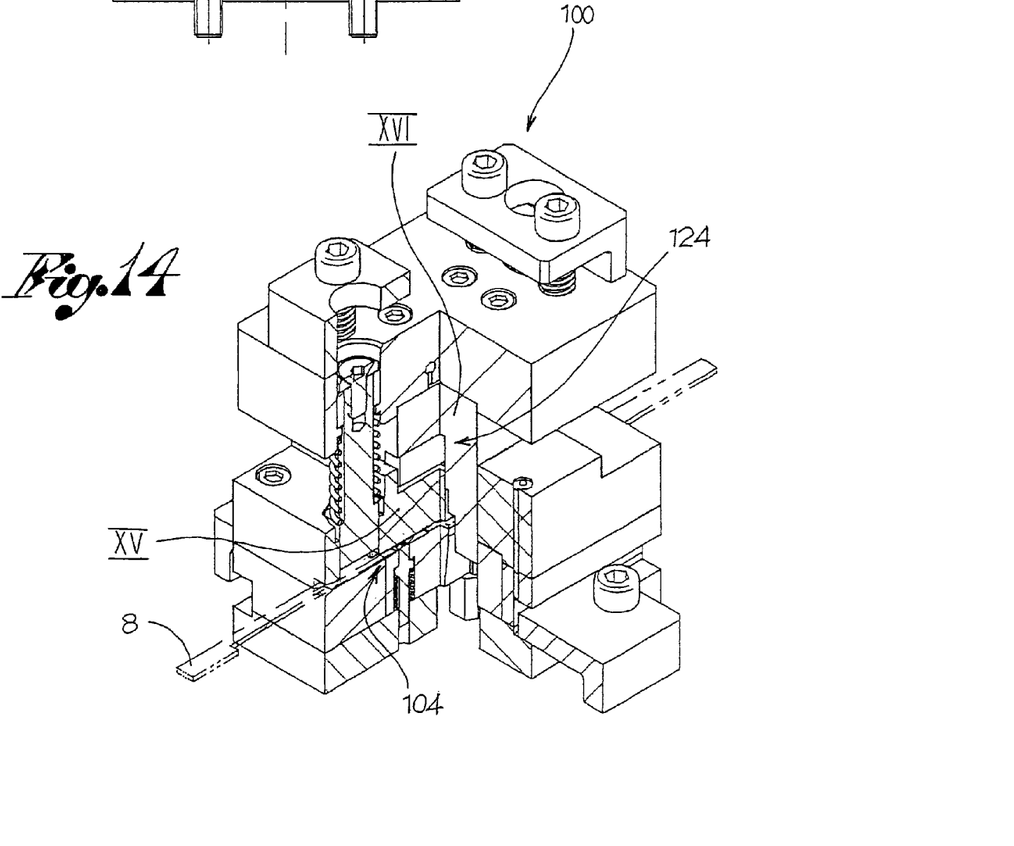
FIG. 14 shows a perspective partly cutaway view of detail XIII of FIG. 1.
Figure 15:
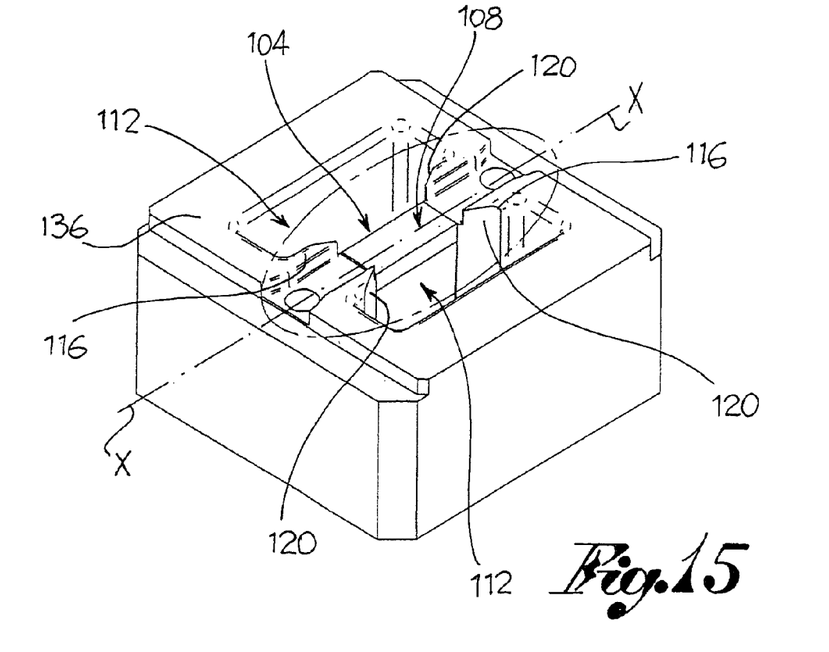
FIGS. 15-16 show perspective views of details XV and XVI of FIG. 14.
Figure 16:
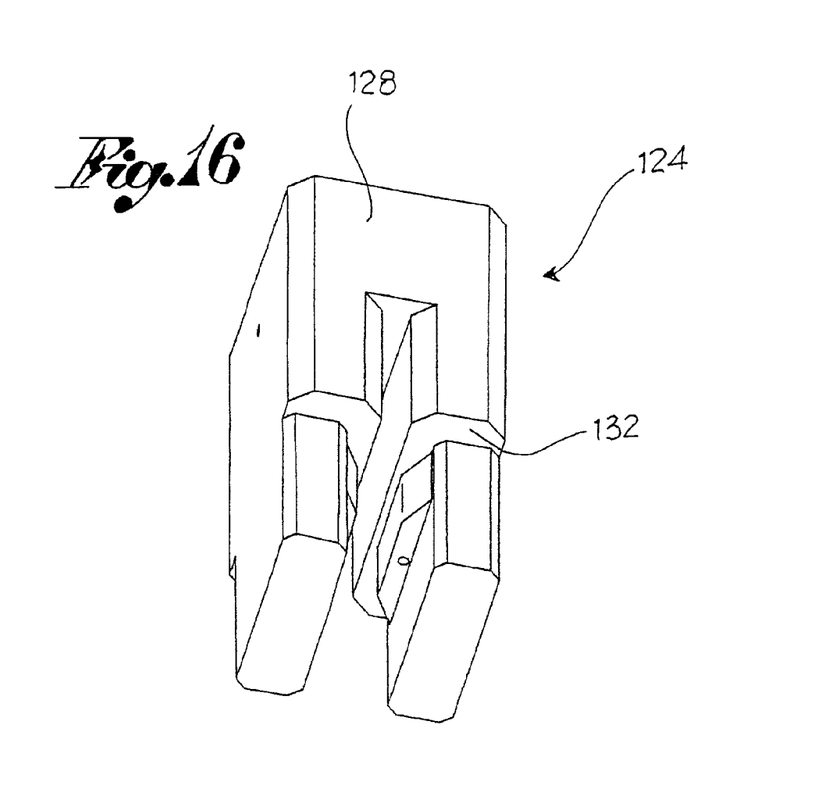

In particular, conductor 8 is loaded into the first stripping station 24 in a rectilinear shape, so as to arrange it parallel to the prevailing extension X-X within the first stripping seat 32 (FIG. 5).

The first broaches 40 are actuated so as to first advance said broaches symmetrically towards a centre line plane M-M of said conductor 8, as well as the first stripping seat 32, the centre line plane M-M being parallel to the prevailing extension direction X-X (FIG. 6).

During such symmetrical approach, edges 56 of the broaches begin to symmetrically remove coating 20 from the longer sides 12 of conductor 8.

A first broach 40' is then advanced so as to go beyond at least the centre line plane M-M with the relevant cutting edge 56' and at the same time the second broach 40" is retracted so as to not interfere with the advance motion of the first broach 40' (FIG. 7).

A reverse movement of the broaches is then carried out so as to completely retract the first broach 40' up to fully release it from conductor 8 and advance the second broach 40" so as to entirely cross the longer side 12 of conductor 8 and go beyond the opposite shorter side with the relevant cutting edge 56" (FIG. 8).

In this way, the second broach 40" substantially carries out a second passage on the longer sides 12 of conductor 8 so as to remove any residues of insulating coating 20 while removing the resulting scrap.

Following the passage in the first stripping station 24, coating 20 is removed from the longer sides 12 at the stripping portion 36 of conductor. The removal of coating 20 from the shorter sides 16 is carried out in the second stripping station 100.

Preferably, the second stripping station 100 is aligned with the first stripping station 24 so as to feed the conductor to the second stripping station 100 by simply shifting it parallel to the prevailing extension X-X.

The stripping portion 36, partially processed on the longer sides 12, is then moved at the second seat 104, arranging said stripping portion 36 on the support surface 108, so that the shorter sides 16 of conductor 8 are projecting relative to the support surface and directly facing cavities 112.

A vertical working stroke is then carried out with the second broaches 124 along direction Z-Z so as to remove the coating present on the shorter sides 16 in a single working stroke.

The smaller extension of the shorter, sides 16 relative to the longer sides 12 is such as to not usually require further passages for ensuring the total removal of coating 20 from the stripping portion 36.

Following the passage into the second stripping station 100, the stripping portion 36 is completely free from any residues of coating 20 on its four sides, longer and shorter 12, 16, and can thus be subject to subsequent operations such as cutting the conductor at the stripping portion 36, subsequent conductor pre-forming and forming operations and finally, welding operations of conductor 8 at the cutting fragments without coating 20.

As can be appreciated from the description, the stripping apparatus and method according to the description allow overcoming the disadvantages of the prior art.

In particular, the stripping according to the present description implies advantages in terms of processing accuracy along with a high removal speed of the insulating coating.

The processing accuracy is important for a correct subsequent welding of the conductor it is necessary to fully remove the coating without leaving any residues.

Moreover, the described stripping apparatus allows a quick and complete removal of the scrap without forming projections of the same that may impair the system cleaning.

A man skilled in the art may make several changes and adjustments to the apparatus and methods described above in order to meet specific and incidental needs, all falling within the scope of protection defined in the following claims.

The invention claimed is:

1. A stripping apparatus for an electrical bar conductor, the conductor comprising a metal core having two longer sides opposite each other and two shorter sides opposite each other, and an electrically insulating coating that at least partly coats said core;
wherein the apparatus comprises a first stripping station, the first stripping station delimiting a first seat, the first seat being arranged parallel to a prevailing extension (X-X) of the apparatus and comprising a pair of side containment walls directly facing the shorter sides of the conductor; wherein the first stripping station comprises:
 (a) a stripping portion cantilevered between two supports, the stripping portion comprising a space having an axial length, measured parallel to the prevailing extension (X-X), that is shorter than or equal to the distance between the supports, the stripping portion adapted to at least partly house the conductor arranged along the prevailing extension (X-X), such that the conductor rests on one of the longer sides when housed within the stripping portion;
 (b) a first pair of broaches operatively connected to the apparatus and aligned with the stripping portion, each broach being axially movable along a Y-Y axis in a direction perpendicular to the prevailing extension (X-X), each broach contacting the conductor such that movement of the broach along the Y-Y axis removes a portion of the electrically insulating coating when the conductor is housed within the stripping portion.

2. Apparatus according to claim 1, wherein said side containment walls are at least partly defined by calibrated plates, provided on the first seat, which at said portion cantilevered between the supports, comprise at least one undercut so as to have a thickness smaller than or equal to the thickness of the conductor, measured perpendicularly to the longer sides, for allowing the passage of said broaches on the calibrated plates without exerting any interference.

3. Apparatus according to claim 2, wherein the calibrated plates comprise a pair of undercuts, opposite to one another, each substantially aligned to a corresponding longer side of the conductor.

4. Apparatus according to claim 1, wherein said first broaches are mechanically connected to first actuating members according to a rotation-translation coupling.

5. Apparatus according to claim 4, wherein the coupling between the first broaches and the relevant first actuating members is a shape coupling of the prismatic type.

6. Apparatus according to claim 4, wherein the first actuating members of the first broaches are synchronised with each other.

7. Apparatus according to claim 1, comprising a second stripping station, suitable for receiving the conductor coming out of the first stripping station and carrying out the removal of the coating from said shorter sides of the conductor.

8. Apparatus according to claim 7, wherein said second stripping station is aligned with respect to the first stripping station relative to the prevailing extension (X-X) of the conductor, so as to receive the conductor in output from the first stripping station keeping the straightness and the parallelism of the conductor relative to the prevailing extension (X-X).

9. Apparatus according to claim 7, wherein the second stripping station houses the conductor defining a support surface suitable for receiving the conductor resting at a longer side thereof.

10. Apparatus according to claim 9, wherein the support surface is delimited by a pair of cavities, arranged on opposite sides of the conductor relative to the cross working direction (Y-Y), the cavities extending perpendicular to the support surface along a vertical working direction (Z-Z), substantially parallel to said shorter sides of the conductor.

11. Apparatus according to claim 9, wherein the support surface has a smaller cross width than the longer sides of the conductor, so that in resting configuration of the conductor on said surface, the shorter sides are at least partly cantilevered relative to the surface itself, along the cross working direction.

12. Apparatus according to claim 7, wherein the second stripping station comprises a second pair of broaches suitable for intercepting and abrading the shorter sides of the conductor according to a vertical working direction (Z-Z) perpendicular to the cross working direction (Y-Y) and substantially parallel to said shorter sides.

13. Apparatus according to claim 12, wherein said second broaches are substantially counter-shaped relative to the cavities, so as to slide in a guided manner within the same cavities, parallel to the vertical working direction (Z-Z).

14. Apparatus according to claim 12, wherein the second broaches are integrally connected to one another by a crosspiece that therefore allows the concurrent actuation thereof.

15. The apparatus of claim 1, wherein each broach comprises a pair of branches, the branches forming a fork shape on their cross sections, each branch comprising a working end, each working end comprising a tool.

16. The apparatus of claim 15, wherein the tool comprises an edge that contacts the conductor, the edge being capable of removing the electrically insulating coating from the conductor.

17. The apparatus of claim 15, wherein the pair of branches is configured such that they are above and below the conductor respectively, the branches defining an air gap having a small thickness than a short side of the conductor, so as to permit removal of the insulating coating from a long side of the conductor.

* * * * *